(Model.)  3 Sheets—Sheet 1.

H. GERRED.
GRAIN METER.

No. 249,609.  Patented Nov. 15, 1881.

Attest:
R. F. Barnes
Frank L. Middleton

Inventor:
Hugh Gerred
By Ellis Spear
Atty (Model.)

H. GERRED.
GRAIN METER.

No. 249,609. Patented Nov. 15, 1881.

3 Sheets—Sheet 2.

Attest:
R. F. Barnes.
Frank L. Middleton.

Inventor:
Hugh Gerred
By Ellis Spear
Atty

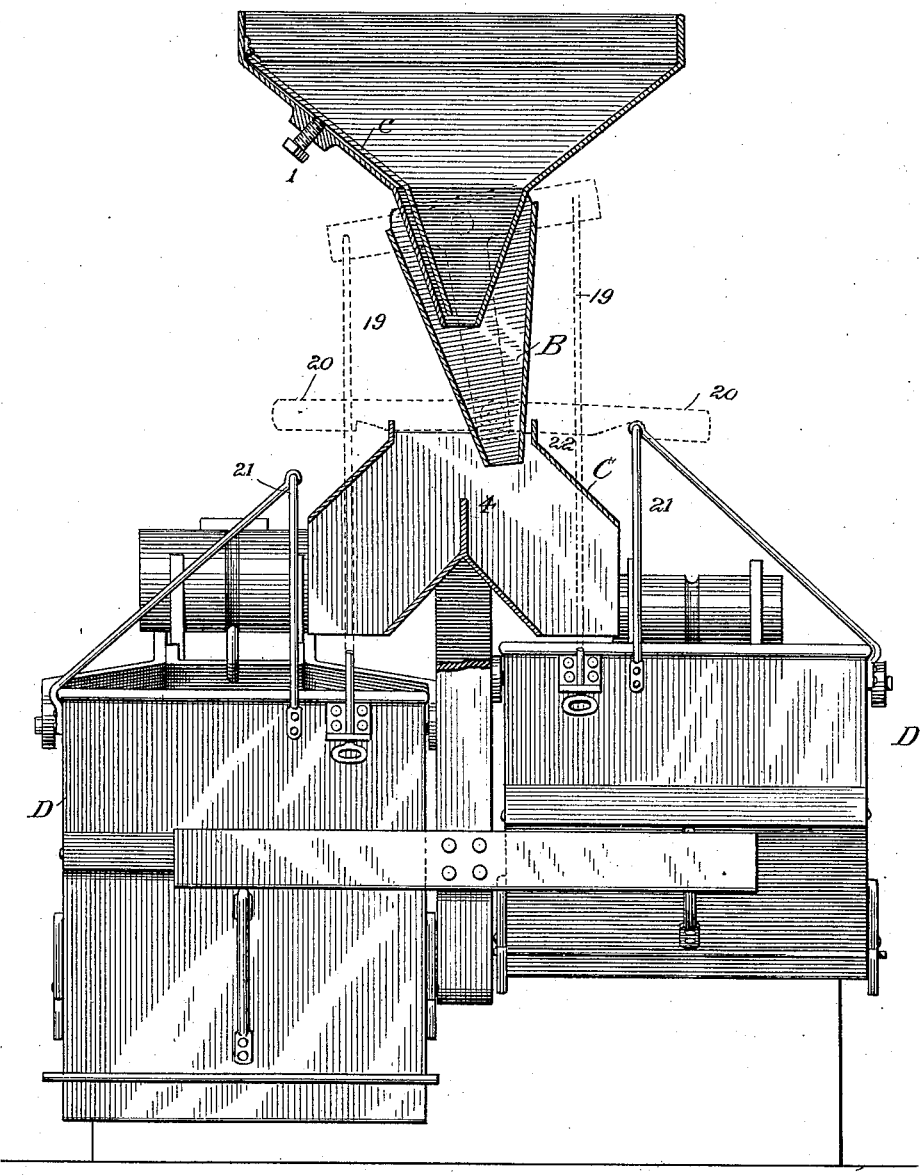

United States Patent Office.

HUGH GERRED, OF CHESTER, ILLINOIS.

GRAIN-METER.

SPECIFICATION forming part of Letters Patent No. 249,609, dated November 15, 1881.

Application filed May 12, 1881. (Model.)

*To all whom it may concern:*

Be it known that I, HUGH GERRED, of Chester, in the county of Randolph and State of Illinois, have invented certain new and useful Improvements in Grain-Weighing Machines; and I do hereby declare that the following is a full, clear, and exact description of the same.

My invention relates to automatic grain-weighers, the object of the invention being to provide a simple self-acting device adapted to permit the continuous flow of grain and to weigh and register the amount of grain passing through it.

The whole construction shown in the accompanying drawings is fully described hereinafter, and the particular devices and combinations which constitute my invention are specifically claimed.

Figure 1:
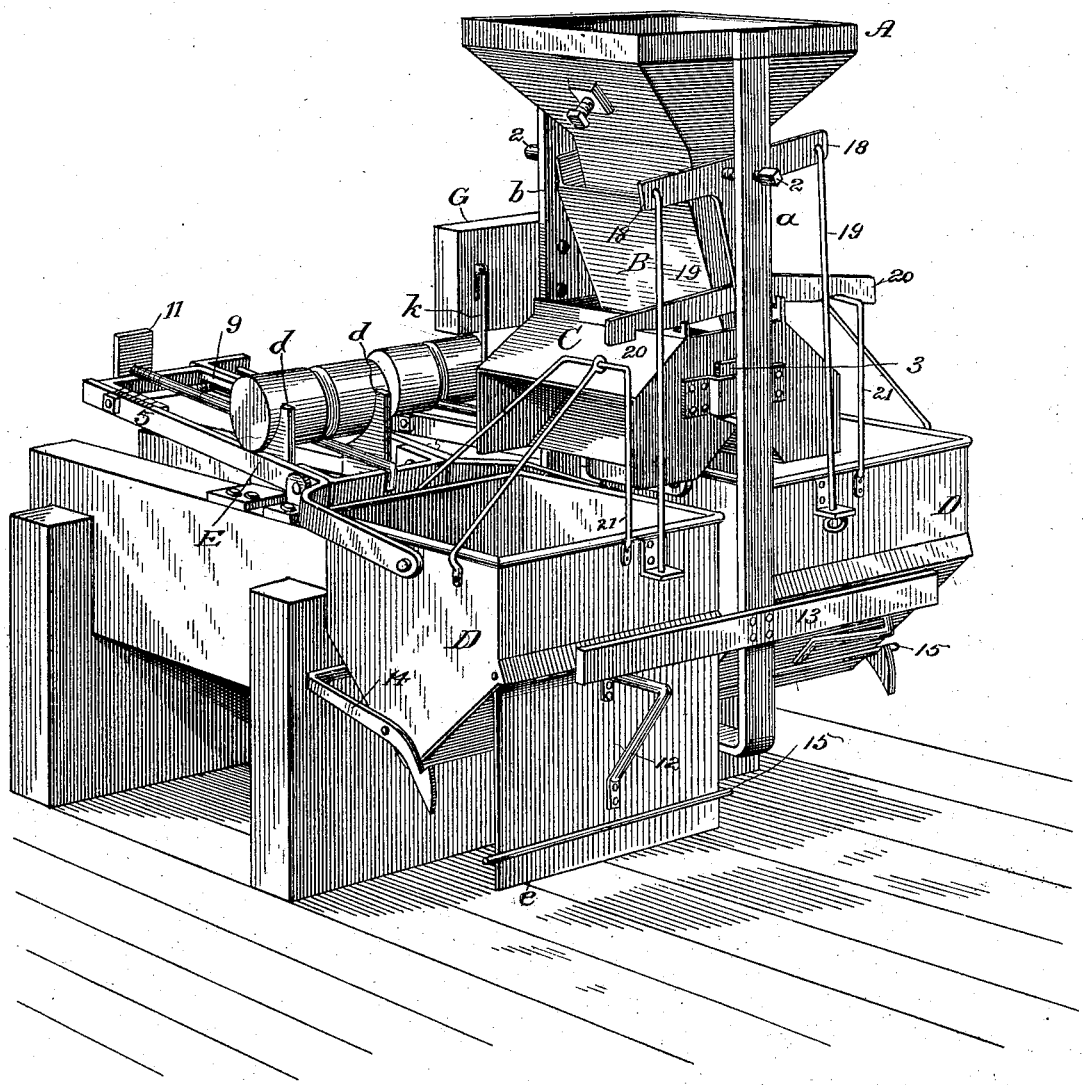
Figure 2:
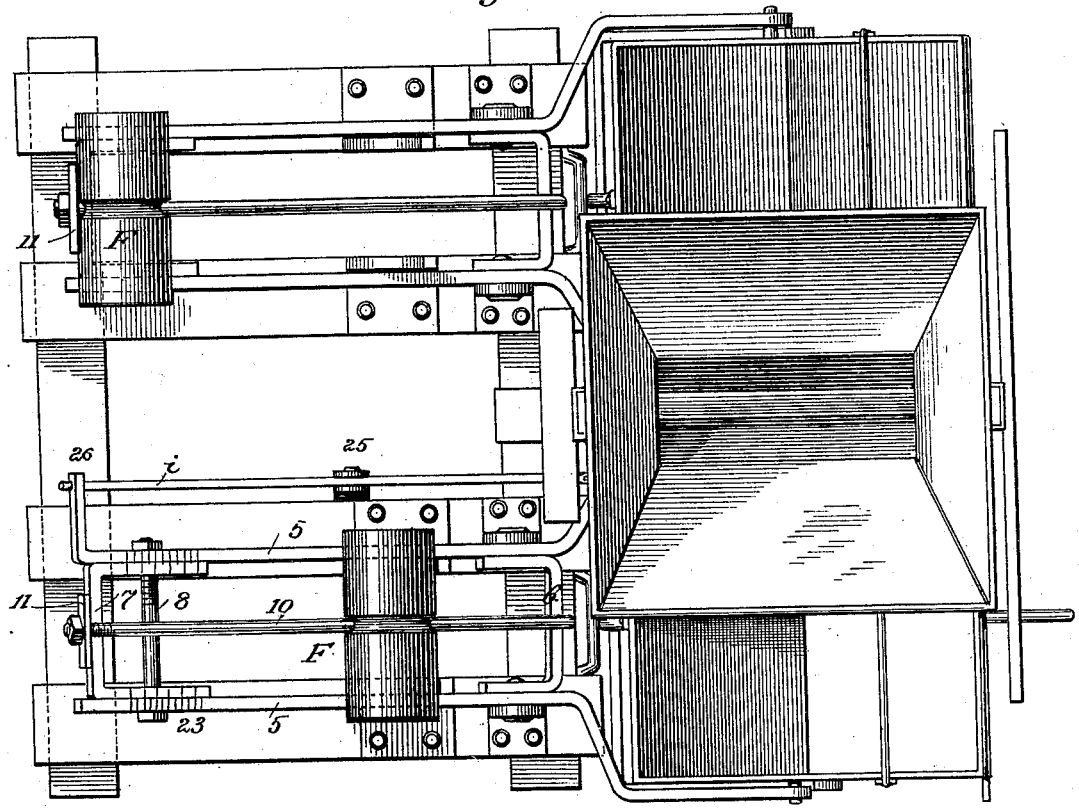
Figure 3:
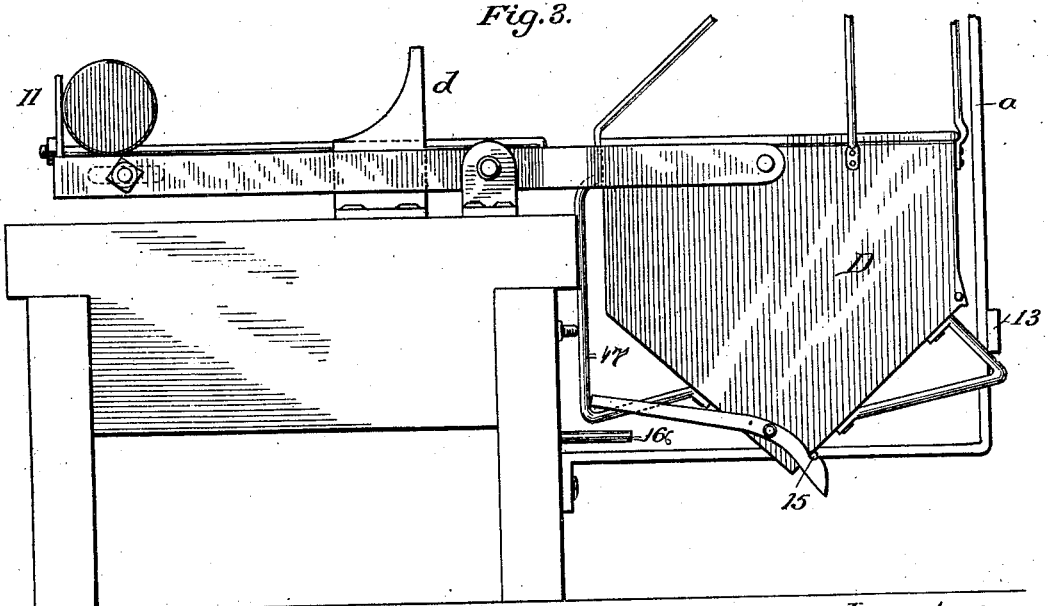

In these drawings, Figure 1 shows a perspective view of the apparatus; Fig. 2, a plan view; Fig. 3, a side elevation in part; Fig. 4, an end view, partly in section.

In these drawings, A represents the chute, which receives the grain in a constant stream and delivers it to the weighing-buckets. It is supported upon front and rear standards, $a\ b$, being fixed thereto at their upper ends. It is provided with a false side, $c$, as shown clearly in Fig. 4, which extends down into the mouth of the chute, and is adjustable in or out by means of a set-screw, 1, the adjustability serving to vary the area of the mouth of the chute. The chute A discharges into a movable chute, B, which is pivoted upon bearings 2 2 in the standards $a\ b$, and is capable of limited oscillation from side to side within the mouth of the divided fixed chute C, said chute being also supported upon the brackets 3 3 on the standards.

The two branches of the divided chute have their open ends over the grain-buckets, as shown in Figs. 1 and 4. A dividing-wall, 4, separates the two parts centrally, with space enough on each side for the movable chute B to deliver into either branch.

The grain-buckets are shown at D D. They are hung upon the forked ends of scale-beams E E, pivoted near the edge of a suitable platform, the forked ends extending beyond the platform and supporting the buckets by the sides thereof.

Although I have shown the upper chute pivoted and the lower rigid, it is manifest that the conditions may be reversed, and the lower chute, instead of the upper, may be made movable and be connected to the operating mechanism.

The scale-beams are composed of frames consisting of side pieces, 5 5, and cross-bars 6 7. The cross-bars 6 are bolted rigidly to the side bars; but the cross-bars 7 are connected to the side bars by a transverse bolt, 8, which passes through slots, as shown at 9, Fig. 1, in the inwardly-turned ends of said cross-bars. A central rod, 10, is hooked over the bar 6 and passes through a stop-plate, 11, riveted to the cross-bar 7, being held to said plate by a nut, by means of which and the slotted connections heretofore described the cross-bar 7, with the stop-plate secured thereto, may be adjusted in or out, for the purpose hereinafter explained. Two curved standards, $d$, are set in the platform by the side bars of the scale-beams, and just in rear of the pivots on which the levers turn. Upon these scale-beams, between the stop-plate 11 and the curved standards $d$, are arranged roller-weights F. These weights have central peripheral grooves, which fit upon the central rod, 10, and guide the rollers in their backward and forward movement. When the buckets are raised to their full height the rear ends of the scale-beams are slightly lower than the front-ends, so that the weights remain in position against the stop-plates 11.

The rollers may be of various forms, and may obviously be varied in position without material change in result. They may have two grooves fitted to roll on sharp edges of the side bars or frame of the scale-beam. An equivalent arrangement would also be to suspend a stationary weight from the ends of the scale-beams and provide a counterpoise-weight to rest at the fulcrum and roll toward the bucket when the designated amount of grain was received.

The buckets are arranged to work alternately, one filling while the other is discharging. One of the buckets is shown in Fig. 3 in side elevation and in Fig. 4 in end elevation as elevated to its full height. The position of the weight is then shown in Fig. 3, and the position of the movable chute B is also shown in Fig. 4, when the right-hand bucket is elevated, as therein represented. The bottom of each bucket is a double incline, one side being pivoted at its upper edge, adapted to open by gravity to a position shown in Fig. 1, the hinged bottom being marked e.

Fixed upon the outer surface of the bucket is a triangular-shaped bar, 12, which, when the bucket is lowered, swings under a cross-bar, 13, on the standard a; but when the bucket is raised this cross-bar, acting upon the angle-iron 12, forces the hinged bottom to close upon its seat. It is there caught and held by a catch-bail, 14, the bail having catches at both ends working over the projecting ends of the rod 15 on the hinged bottom. The weight of the rear end of the bail causes it to retain the bottom in place; but when the bucket is lowered this bail strikes against a pin, 16, unhooking the hinged bottom and permitting it to drop. The bail is held in proper position by means of a loop, 17, on the back of the bucket.

For the automatic working of the whole device it is necessary that the movable chute B should be swung over the rising bucket in each movement of the apparatus. This is accomplished by means of arms 18 18 fixed to one end of said movable chute at the upper side and connected by rods 19 to the front side of the buckets. It will be obvious from an inspection of Fig. 4 that the alternate rise and fall of the buckets will throw the chute alternately from side to side, so that its lower end will always be over the elevated bucket. This chute is held more securely in place by catches 20, which hook over bails 21 on the top of the buckets. These hooks are pivoted to one end of the movable chute at the lower part, and rest in guide-notches in flanges 22 on the divided fixed chute. As the bucket falls it draws the bail out of connection with the hook by the first part of its movement and leaves the rod 19 free to act to deflect the chute from the one side to the other.

It will be understood that the stop-plates 11 are accurately set for a given weight of grain. They may be so set by means of a gage on the frame of the lever, as shown at 23, Fig. 2.

It will also be understood that the curved standards d are set at such a point that the weight of the rollers, when arrested by them, will overbalance the weight of the empty buckets, whereby the rollers are caused to return through their own gravity, when the bucket is empty, to their position at the ends of the scale-beams, thereby raising the bucket and shutting the bottom. These parts being thus adjusted, and the apparatus being, for illustration, in the position shown in Fig. 4, the grain is admitted to the chute A and passes down into the right-hand bucket D, the bottom of which has been closed by the bar 13, and the weight rolled back against the rear stop, 11. As soon as a designated weight of grain has been received by the bucket it at once overcomes the weight of the roller, throws up the rear end of the scale-beams on which the roller rests, causing the roller to start forward toward the standards, on which it ultimately rests, and the bucket to instantly fall. As it falls it at once throws the chute B to the other side. If, instead of a roller, a weight were hung at the end of the scale-beam, it would shut in and retain about one-third of the grain, and it is the movement of the rollers on the beam which gives the grain time to be discharged. Further, it is the action of the rollers moving to the curved standards which causes the accurately-weighed grain to change the flow into the empty bucket and to open the bottom of the full bucket.

In connection with this apparatus I have also provided an automatic register, G, fixed to the rear standard, b, and operated by a lever, i, and connecting-rod k. The lever is pivoted at 25, and passes through an arm, 26, of the side bar, 5. Reciprocating motion of the rod k is adapted to operate any of the well-known kinds of registers, the details of which are well known and need not here be described.

Having thus described my invention, what I claim is—

1. An automatic grain-weighing machine consisting of the buckets D D, suspended upon scale-beam E, in combination with the movable weights, and with a movable chute, the said buckets being connected by mechanism, substantially as described, whereby a determined weight of grain in one bucket causes the bucket to sink, shifts the chute, lowers the other bucket, adjusts the hinged bottoms, and moves the weights, substantially as set forth.

2. The combination of the alternately-moving buckets, the rods 19, the arms 18, and the movable chute B, substantially as described.

3. The combination of the movable chute, arms 18, rods 19, buckets D, the latches 20, and the bails 21, substantially as described.

4. The combination of the pair of buckets, the pivoted scale-beams E E, fixed stops d, and the adjustable stop-plate 11, as set forth.

5. In combination with the pivoted buckets, the scale-beams composed of side bars, cross-bars, and central rod, 10, adapted to operate in connection with the rollers and the fixed posts or stops d d, substantially as described.

6. In combination with the buckets, the pivoted bottom, the catch-bail 14, and the stop-pin 16, as set forth.

7. The combination, with the side bars, 5 5, in the scale-beam E, the adjustable cross-bar 7, said bars being provided with gage-marks, as set forth.

8. In combination with the scale-beam E, provided with oscillating bucket and movable weight, the lever i, rod k, and register, substantially as described.

HUGH GERRED.

Witnesses:
ROBERT H. MANN,
HENRY SPECKMAN.